3,141,757
HERBICIDAL PHENOXYACETAMIDES
Jean Metivier, Arpajon, and Hubert Guivier, Lyon, France, assignors to Societe des Usines Chimiques Rhone-Poulenc, Paris, France, a French body corporate
No Drawing. Filed July 20, 1960, Ser. No. 44,023
Claims priority, application France July 28, 1959
8 Claims. (Cl. 71—2.5)

This invention relates to herbicidally active compounds and more particularly is concerned with new N-substituted phenoxyacetamides having herbicidal properties, their production, their use as herbicides and herbicidal compositions containing them.

The N-substituted phenoxyacetamides of the present invention are compounds of the general formula:

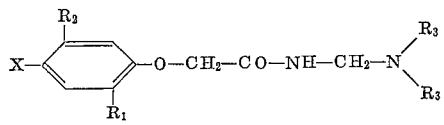

in which X represents a halogen atom, $R_1$ and $R_2$, which may be the same or different, each represent a hydrogen or halogen atom or a formyl, lower alkyl, hydroxy lower alkyl or lower-alkoxymethyl group, and $R_3$ and $R_4$, which may be the same or different, each represent a lower alkyl group or together with the nitrogen atom to which they are attached form a heterocyclic group, e.g., piperidino, pyrrolidino or morpholino group, and their salts and quaternary ammonium derivatives.

By the expression "lower" when used herein in connection with alkyl and alkoxy groups is meant that the groups contain no more than 3 carbon atoms.

The N-substituted acetamides of the invention possess interesting herbicidal properties and may be used, e.g., for killing weeds in wheat and other cereal crops, at varying dosage rates depending on the nature of the plants to be destroyed and the effect sought. Taking into account these two factors, good results are generally achieved with dosage rates of 0.5 to 2 kg. per hectare of active material. These acetamides are active especially against dicotyledons, in particular *Amaranthus retroflexus*, *Brassica* spp., *Carduus tenuiflorus*, *Centaurea mellitensis*, *Centaurea nigra*, *Chenopodium album*, *Chrysanthemum* spp., *Cirsium arvense*, *Daucus glochidiatus*, *Linaria cymbalaria*, *Plantago major*, *Polygonum lapathiofolium*, *Raphanus raphanistrum*, *Rumex crispus*, *Senecio vulgaris*, *Sonchus arvensis*, *Stellaria media*, *Taraxacum officinale*, and *Urtica dioica*. Of particular interest are compounds in which $R_1$ has the meaning given above, $R_2$ is a hydrogen atom and $R_3$ and $R_4$ are both ethyl groups.

According to a feature of the invention the aforesaid compounds may be produced by condensing an amide of the general formula:

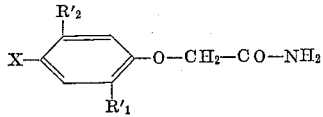

(wherein X is a halogen atom and $R'_1$ and $R'_2$ are atoms or groups identical with $R_1$ and $R_2$ or convertible thereto after the condensation reaction) with formaldehyde and a secondary amine of the formula:

if necessary converting $R'_1$ and $R'_2$ into $R_1$ and $R_2$, and if desired converting the resulting base into a salt or quaternary ammonium derivative by methods known per se for salt formation or quaternization of tertiary amines.

(By "methods known per se" is meant methods described in the chemical literature or in actual use.)

To carry out the condensation, the reactants are normally heated to a temperature between 30° C. and 150° C., preferably in an aqueous medium or organic medium, e.g., ethanol, toluene or tetrahydrofuran.

The aforesaid compounds can be used in all the physical forms utilisable for the application of herbicidally active substances. They are usually mixed with at least one diluent, and the resulting herbicidal compositions are included within the scope of the invention. For example, they can be applied in the form of aqueous solutions (when the active compounds are soluble in water) or emulsions or suspensions. To use them in one or other of these liquid forms, ionic or non-ionic wetting, dispersing or emulsifying agents are generally used, non-ionic compounds being, however, preferred because of their insensitivity to electrolytes. Aqueous solutions can be prepared immediately before use by dissolving in water the products of the invention as such or in the form of solid or liquid concentrates. Emulsions ready for actual use may be obtained by diluting concentrated emulsions or by diluting emulsifiable concentrates. The latter may themselves be obtained by dissolving the active ingredient in a suitable dispersing agent, with or without a suitable organic solvent compatible with the dispersing agent.

For the preparation of powders, calcium carbonate, kaolin, talc, calcined magnesia, kieselguhr, tricalcium phosphate, sodium sulphate, cork dust and other inert mineral organic diluents may be used. The desired mixture may be obtained by grinding the active ingredient with the inert diluent but may also be produced by impregnating the diluent with a solution of the active substance in a volatile solvent, which solvent is later removed.

The following examples illustrate the invention.

Example I

Aqueous solutions of dimethylamine (7.1 N; 42 cc.) and formaldehyde (325 g./litre; 28 g.) are added to 4-chlorophenoxyacetamide (46.4 g.) and the mixture heated at 70° C. for 6 hours. The reaction mass is poured into a mortar in which crystallization takes place. After separation of the solid and recrystallization from petroleum ether, N-dimethylaminomethyl - 4 - chlorophenoxyacetamide, M.P. 68° C. (41.5 g.), is obtained.

Example II

Proceeding as in Example I, but replacing the dimethylamine by an aqueous solution of diethylamine (10 N; 32.1 cc.) there is obtained, after recrystallization from petroleum ether, N-diethylaminomethyl-4-chlorophenoxyacetamide, M.P. 66° C. (64.7 g.).

Example III

An aqueous solution of formaldehyde (272 g./litre; 27.5 cc.) is poured into a suspension of 2,4-dichlorophenoxyacetamide (55 g.) in an aqueous solution of dimethylamine (371.5 g. of dimethylamine per 1000 g. of solution; 30.25 g.) with vigorous agitation, followed by heating for 5 hours at 70° C. During cooling a solid crystallizes out which is dried and then extracted with cold benzene (330 cc.). The insoluble material is separated by filtration and the filtrate, after treatment with decolourising charcoal is evaporated, leaving a residue M.P. 88° C. (62 g.). On recrystallization from cyclohexane a product is obtained, M.P. 89–90° C. Analysis of this product shows it to be N-dimethylaminomethyl-2,4-dichlorophenoxyacetamide.

Example IV

Diethylamine (43.6 g.) and an aqueous solution of formaldehyde (30%; 56 cc.) are added to a suspension of 2,4-dichlorophenoxyacetamide (110 g.) in water (100 cc.). After heating for 6 hours, the reaction mixture is extracted with benzene (500 cc.) and, after treatment with decolourising charcoal and evaporation of the solvent, a solid residue remains (150 g.). After recrystallization of the latter from cyclohexane, N-diethylaminomethyl-2,4-dichlorophenoxyacetamide, M.P. 75° C. (123 g.) is obtained.

*Example V*

Di-n-propylamine (30.3 g.) and an aqueous solution of formaldehyde (30%; 28.3 cc.) are added to a suspension of 2,4-dichlorophenoxyacetamide (55 g.) in water (100 cc.) and heated for 10 hours at 70° C. After treatment as in Example IV and recrystallization from benzene, N - di - n - propylaminomethyl-2,4-dichlorophenoxyacetamide, M.P. 68° C. (64 g.) is obtained.

*Example VI*

Pyrrolidine (21.3 g.) and an aqueous solution of formaldehyde (30%; 28.3 cc.) are added to a suspension of 2,4-dichlorophenoxyacetamide (55 g.) in water (100 cc.) and heated for 6 hours at 70° C. The precipitate which forms is extracted with benzene (400 cc.) and, after drying over sodium sulphate and evaporation of the benzene, N-1-pyrrolidinylmethyl-2,4-dichlorophenoxyacetamide (72 g.) is obtained which, after recrystallisation from benzene, melts at 89–90° C.

*Example VII*

Proceeding as in Example V but replacing the di-n-propylamine (30.3 g.) by morpholine (26.1 g.) there is obtained N-morpholinomethyl-2,4-dichlorophenoxyacetamide (70 g.) M.P. 100° C.

*Example VIII*

An aqueous solution of dimethylamine (7.1 N; 70 cc.) is added to 2-methyl-4-chlorophenoxyacetamide (100 g.), followed by an aqueous solution of formaldehyde (325 g./litre; 46.2 cc.). After heating at 70° C. for 8 hours, N-dimethylaminomethyl-2-methyl-4-chlorophenoxyacetamide, M.P. 50° C. (132.5 g.) is obtained by treatment as in Example IV. After recrystallisation from a benzene-petroleum ether mixture (1:1) the desired product (91.4 g.) melting at 66° C. is obtained.

*Example IX*

An aqueous solution of formaldehyde (325 g./litre; 28 cc.) is added to a suspension of 2-methyl-4-chlorophenoxyacetamide (50 g.) in an aqueous solution of diethylamine (10 N; 32.1 cc.). After treatment as in Example VI a crude product (69.5 g.) is obtained which, after recrystallisation from petroleum ether, yields N-diethylaminomethyl - 2 - methyl - 4 - chlorophenoxyacetamide (49.3 g.), M.P. 68.5° C.

*Example X*

Di-n-propylamine (60.6 g.) and an aqueous solution of formaldehyde (325 g./litre; 56 cc.) are added to a suspension of 2-methyl-4-chlorophenoxyacetamide (100 g.) in water (60 cc.) and heated under reflux for 8 hours. After treatment as indicated in Example IV and recrystallisation from petroleum ether, N-di-n-propylaminomethyl - 2 - methyl-4-chlorophenoxyacetamide (132 g.) M.P. 75° C. is obtained.

*Example XI*

Methyl iodide (6.8 g.) is added to a solution of N-dimethylaminomethyl-4-chlorophenoxyacetamide (11 g.) in acetone (50 cc.) and allowed to stand over night. After removing the solvent by filtration, N-dimethylaminomethyl - 4 - chlorophenoxyacetamide methiodide (11.5 g.) M.P. 220° C., is obtained.

*Example XII*

Methyl sulphate (8.7 g.) is added to a solution of N-dimethylaminomethyl - 2,4 - dichlorophenoxyacetamide (18.3 g.) in acetone (80 cc.). After stirring for 2 hours, a white precipitate forms (21.7 g.), M.P. 159–160° C. which is recrystallized from ethanol. Analysis of this product shows it to be 2,4-dichlorophenoxyacetamidomethyltrimethylammonium methosulphate.

*Example XIII*

Methyl iodide (10 g.) is added to a solution of N-dimethylaminomethyl - 2,4 - dichlorophenoxyacetamide (18.3 g.) in acetone (80 cc.) and stirred for 2 hours. The precipitate obtained is separated by filtration and after drying melts at 215° C. (24 g.). This product is recrystallized from ethanol. Analysis shows it to be 2,4 - dichlorophenoxyacetamidomethyltrimethylammonium iodide.

*Example XIV*

Methyl sulphate (5.2 g.) is added to a solution of N-dimethylaminomethyl - 2 - methyl - 4 - chlorophenoxyacetamide (10 g.) in acetone (45 cc.). The solid which precipitates is separated by filtration and 2-methyl-4-chlorophenoxyacetamidomethyltrimethylammonium methosulphate (10.5 g.), M.P. 153° C. is obtained.

*Example XV*

The product (50 g.) prepared in Example III is dissolved in xylene (250 cc.) and to it is added a product obtained by the condensation of ethylene oxide and octylphenol and containing 10 moles of ethylene oxide per mole of octylphenol (20 g.). The solution thus obtained is diluted with water (100 litres) and the emulsion thus prepared is used to destroy weeds in the cultivation of wheat or cereals.

*Example XVI*

A product obtained by the condensation of 10 moles of ethylene oxide with one mole of octylphenol (125 g.) is added to N-diethylaminomethyl-2-methyl-4-chlorophenoxyacetamide (250 g.) and made up to one litre with anisole. The solution obtained is used, after dilution with water, to remove weeds from cereals.

*Example XVII*

Proceeding as in Example XVI, but replacing N-diethylaminomethyl-2-methyl-4-chlorophenoxyacetamide (250 g.) by the same weight of N-diethylaminomethyl-2,4-dichlorophenoxyacetamide, a solution is obtained which is used, after dilution at a rate of 400 cc. of this solution to 1 hectolitre of water, to destroy weeds in the cultivation of wheat.

*Example XVIII*

A product of the condensation of octylphenol and ethylene oxide and containing 10 moles of ethylene oxide per mole of octyl phenol (20 g.) is added to a solution in 250 cc. of water of the product prepared in Example XII (75 g.) and diluted with water (100 litres). The solution obtained is used to destroy weeds in the cultivation of cereals.

*Example XIX*

A powder containing the product prepared in Example XII (50 g.), sodium dioctylsulphosuccinate (10 g.) and sodium sulphate (40 g.) is prepared by grinding. The solid preparation obtained can be used, after dilution with water, for the destruction of weeds in the cultivation of cereals.

The products described in Examples I to XIV or the compositions ready for use containing these products, various types of which are described in Examples XV to XIX may be used as herbicides at varying dosage rates as discussed heretofore.

We claim:
1. Compounds selected from the class which consists of (a) N-substituted phenoxyacetamides of the formula:

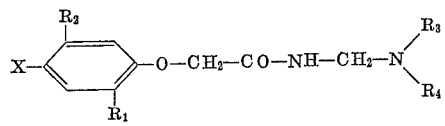

in which X represents a halogen atom, $R_1$ and $R_2$ are selected from the class consisting of hydrogen and halogen atoms and formyl, lower alkyl, hydroxy lower alkyl and lower alkoxymethyl groups, and $NR_3R_4$ is selected from the class consisting of di-lower alkylamino, piperidino, pyrolidino and morpholino groups, and (b) quaternary ammonium derivatives of these N-substituted phenoxyacetamides wherein the acid moiety of the quaternary ammonium group is selected from the class which consists of lower alkyl halides and sulphates.

2. Herbicidal compositions comprising a diluent and at least 0.05% (on the weight of the composition) of a compound selected from the class consisting of (a) N-substituted phenoxyacetamides of the formula:

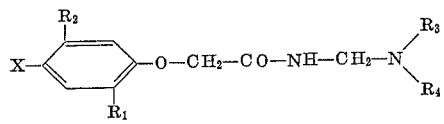

in which X represents a halogen atom, $R_1$ and $R_2$ are selected from the class consisting of hydrogen and halogen atoms and formyl, lower alkyl, hydroxy lower alkyl and lower alkoxymethyl groups, and $NR_3R_4$ is selected from the class consisting of di-lower alkylamine, piperidino, pyrrolidino and morpholino groups, and (b) quaternary ammonium derivatives of these N-substituted phenoxyacetamides wherein the acid moiety of the quaternary ammonium group is selected from the class which consists of lower alkyl halides and sulphates.

3. Herbicidal compositions according to claim 2, containing also a compound selected from the group which consists of wetting, dispersing and emulsifying agents.

4. Herbicidal compositions according to claim 2, in the form of a dispersion of active ingredient in the diluent.

5. Herbicidal compositions according to claim 2, in the form of a concentrate which is self-emulsifiable in water.

6. A method for controlling weeds which comprises applying to the affected area a herbicidally effective amount of a compound selected from the class consisting of (a) N-substituted phenoxyacetamides of the formula:

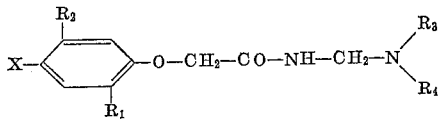

in which X represents a halogen atom, $R_1$ and $R_2$ are selected from the class consisting of hydrogen and halogen atoms and formyl, lower alkyl, hydroxy lower alkyl and lower alkoxymethyl groups, and $NR_3R_4$ is selected from the class consisting of di-lower alkylamine, piperidino, pyrrolidino and morpholino groups, and (b) quaternary ammonium derivatives of these N-substituted phenoxyacetamides wherein the acid moiety of the quaternary ammonium group is selected from the class which consists of lower alkyl halides and sulphates.

7. A method according to claim 6, wherein the said compound is applied to the affected area in association with a compound selected from the group which consists of wetting, dispersing and emulsifying agents.

8. A method according to claim 6, wherein the said compound is in the form of a dispersion in an aqueous diluent.

References Cited in the file of this patent
UNITED STATES PATENTS

| | | |
|---|---|---|
| 2,428,978 | Martin et al. | Oct. 14, 1947 |
| 2,484,295 | Kilgore | Oct. 11, 1949 |
| 2,484,295 | Kilgore | Oct. 11, 1949 |
| 2,668,104 | Eastman | Feb. 2, 1954 |
| 2,715,645 | Cusic | Aug. 16, 1955 |
| 2,765,224 | Lambrech | Oct. 2, 1956 |
| 2,948,754 | Litvan et al. | Aug. 9, 1960 |

FOREIGN PATENTS

| | | |
|---|---|---|
| 792,490 | Great Britain | Mar. 26, 1958 |
| 810,539 | Great Britain | Mar. 18, 1959 |

OTHER REFERENCES

Thompson et al.: "Botanical Gazette," vol. 107, page 494 (1946).

Kurishara et al.: "Chemical Abstracts," vol. 53, pages 10141–42 (June 10, 1959).